United States Patent [19]

Persson

[11] Patent Number: 4,596,686

[45] Date of Patent: Jun. 24, 1986

[54] ADJUSTMENT OF SHAPE AND DIMENSIONS OF A CONCRETE ARTICLE

[75] Inventor: Bengt Persson, Götene, Sweden

[73] Assignee: Br. Perssons Cementvarufabrik AB, Götene, Sweden

[21] Appl. No.: 309,522

[22] Filed: Oct. 6, 1981

Related U.S. Application Data

[63] Continuation of Ser. No. 124,672, Feb. 26, 1980, abandoned.

[30] Foreign Application Priority Data

Mar. 1, 1979 [SE] Sweden .............................. 7901846

[51] Int. Cl.[4] ...................... B29C 59/00; B29C 43/02

[52] U.S. Cl. ..................................... 264/296; 264/71; 264/293; 264/294; 264/297.5; 264/323

[58] Field of Search ............... 264/232, 284, 293, 296, 264/320, 323, 297.5, 71, 294

[56] References Cited

U.S. PATENT DOCUMENTS 3,557,266 1/1971 Chiba .................................. 264/320
4,083,908 4/1978 Kolvinis .............................. 264/333
4,175,106 11/1979 Clarke ................................ 264/320

*Primary Examiner*—Donald Czaja
*Assistant Examiner*—Hubert C. Lorin
*Attorney, Agent, or Firm*—Beveridge, DeGrandi & Weilacher

[57] ABSTRACT

A method for adjusting the tolerances, regarding shape and dimensions, of an elongated vibrated concrete article made in a mould after removing the article from the mould. The invention makes it possible to achieve close tolerances inspite of using a rather wet concrete composition, which is optimized as regards strength but which causes adhering and suction in the mould and alteration of the articles shape before hardening. According to the invention, the method is characterized in that the article, before hardening, is brought into engagement with one long side a straight-edge rule for being shaped thereby, in that the article on the end surfaces is pressed to a predetermined length, and in that the cross sectional shape of the article is adjusted into agreement with the desired shape while keeping the article in engagement with the rule and pressing it on the end surfaces.

13 Claims, 2 Drawing Figures

ADJUSTMENT OF SHAPE AND DIMENSIONS OF A CONCRETE ARTICLE

Figure 1:
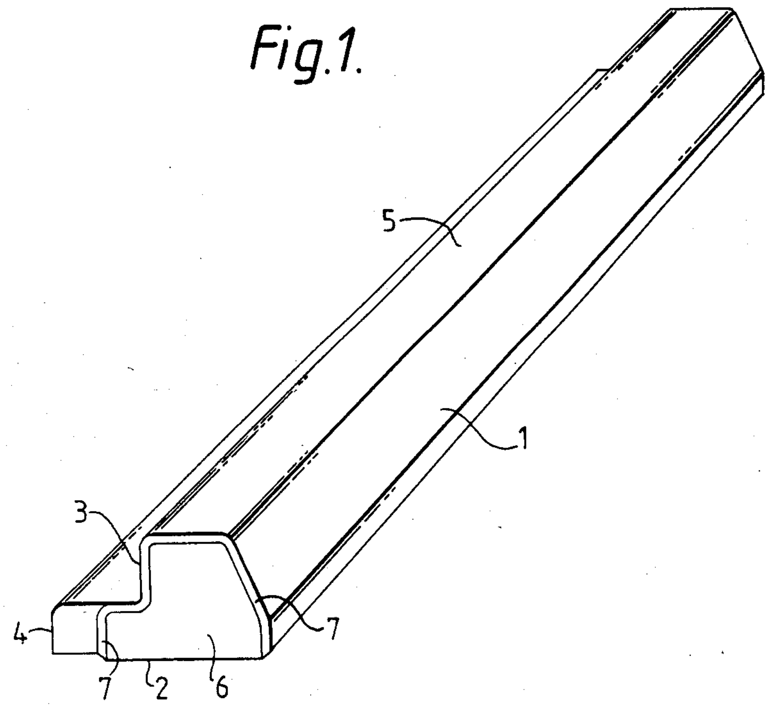

This is a continuation of application Ser. No. 124,672, filed Feb. 26, 1980, now abandoned.

The present invention relates to a method and a device for carefully adjusting the tolerances of an article made from vibrated concrete in a mould after removing the article therefrom. The adjusting refers both to dimensions and shape of the article.

When making such articles from concrete a high degree of precision is required both regarding dimensions and shape, and it has been common practice to use a rather dry concrete composition and to stamp or press it in a mould before removing the article therefrom and letting the concrete harden. Though making possible very close tolerances, both regarding dimensions and shape, such a method of manufacture has the drawback that the concrete, due to its low water content, does not have proportions optimized as regards strength.

In such cases where the method of manufacture indicated above has not offered a strength high enough, there has up to now not existed any technique useful in practice for making concrete articles with very close tolerances regarding both dimensions and shape. This is due to the fact that concrete having proportions optimized as regards strength can not be pressed to form a rigid body in the manner indicated above but must, to achieve maximum strength, be vibrated so the density is increased as far as possible. Even after vibrating, concrete of this composition is rather easily deformable, with the results that an article removed from the mould may be deformed under influence of gravity and further that the removal itself often creates difficult problems, causing different kinds of deformations or damages to the article. This is due to the fact that concrete of this quality has a very troublesome tendency of adhering to the surfaces of the mould, with the result that the removal itself often causes strong suction forces on the concrete articles, thereby causing the said deformations or damages.

Therefore, the present invention has for its object to provide a method for carefully adjusting tolerances, both regarding dimensions and shape, of an article made from vibrated concrete after removing the article from the mould. According to the invention this is achieved in that one long side of the article, after removal from the mould and before hardening, is brought into contact with a straight-edge rule to be shaped thereby, in that the article is pressed on its end surfaces to a predetermined length, and in that the cross sectional shape of the article is adjusted to agreement with the intended one while the article is being held in contact with the rule and is being pressed on its end surfaces.

To ensure that sensitive portions of the article, e.g. certain edge or corner portions at the end surfaces of the article, also are given a correct shape it is, according to the invention, provided that certain portions of the end surfaces of the article are pressed to the intended shape after pressing the article to the predetermined length.

To cure, as far as possible, also those shape defects due to deformation of the concrete under influence of gravity and due to impact forces during removal from the mould, it is provided, according to the invention, that the article, during adjustment of its cross sectional shape, is rubbed in its longitudinal direction, pressure being exerted at least partially on at least one long side of the article remote from the rule.

The invention also has as an object to provide a device for carrying the above method into effect. According to the invention this device is characterized in that a support surface for the article is provided, movable towards and from at least one straight-edge rule, in that adjacent each end of the rule there is provided one pressing plate movable in the longitudinal direction of the rule, and in that there is provided a profiled member movable in a direction parallel to the longitudinal direction of the rule, said profiled member being adapted for engagement with at least that side surface of the article remote from the rule.

To achieve the adjustment of the edge or corner portions of the end surfaces of the article, the device is further characterized in that there is movably provided in proximity of each pressing plate shaping members which are engagable with those portions of the end surfaces of the article extending outside the pressing plates for shaping these portions.

To avoid generation of wave motions in the concrete when contacting the article with the profiled member, which have a tendency of deforming the shape of the article, and to give the profiled member an engagement as uniform as possible with the article, it is provided, according to the invention, that the profiled member included surfaces for contacting both an upper surface of the article and the side surface remote from the rule, that the front and rear end portions of the profiled member, as seen in the direction of movement, are curved out from corresponding surfaces of the article and that the profiled member in proximity to the support surface has a greater length in the direction of movement than is the case at an upper portion for contacting the upper surface of the article.

The invention will now be described in more detail, reference being made to the accompanying drawings. In the drawings FIG. 1 shows a typical example of a concrete article having dimensions and shape to be adjusted according to the teachings of the invention, and FIG. 2 shows schematically, and for the sake of clarity, one half of a device for carrying the inventive method into effect.

Figure 2:
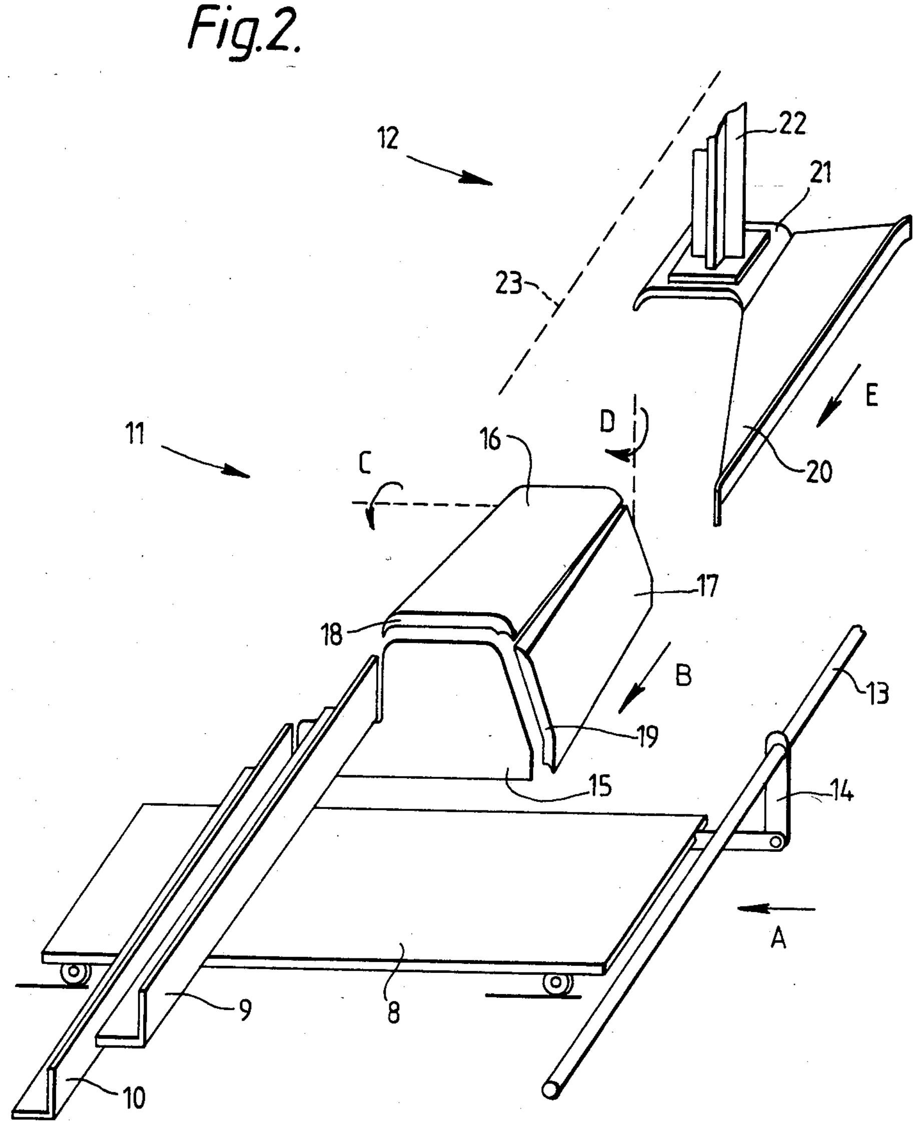

In FIG. 1 there is shown a representative example of a concrete article that either must be accepted with poor tolerances, both regarding shape and dimensions, or must be adjusted in these respects after removal from the mould, provided said article is made from a concrete composition optimized as regards strength. Thus, there is shown in FIG. 1 a concrete curbstone which is intended to have its side surface 1 facing the driveway while the lower side 2 thereof is supported on the surfacing material of the driveway. The curbstone also comprises two back side surfaces, an upper a 3 and one lower one 4, the portion of the curbstone having the lower side surface 4 being intended to be embedded in a material e.g. constituting the surfacing material of a side walk. This surfacing material preferably has the same level as the upper surface 5 of the curbstone. The indicated use of the curbstone means that in practice only the side surface 1 and the upper surface 5 are visible. Even if such curbstones are made to a high degree of precision both regarding shape and dimensions, it is not certain that the underlying surface will be perfect, with the possible consequence that adjacent end portions of two curbstones are displaced vertically from each other. To hide, as far as possible, such defects, the end surfaces 6 of the curbstone are provided with a bevel 7, which may form, e.g. an angle of 45° to the end surface.

To guarantee a sufficient strength to the curbstone it is necessary to make it from concrete having proportions optimized in regard to strength. This means that the concrete contains a considerable amount of water, thus making the concrete plastic so that it cannot be pressed to a rigid body and likewise giving the concrete a troublesome tendency of adhereing to the surfaces of the mould. Under the influence of vibrations in the mould, concrete of this quality assumes a consistency making it possible for the concrete to "flow" so that the mould is completely filled and so that possible bubbles or pockets of air are removed. Immediately after vibration, the concrete regains its semi-rigid, plastic consistency. In this connection it should be noted, however, that the concrete also could be regarded as somewhat thixotropic, which implies that it becomes flowable under the influence of large forces. In order to make it possible to remove the curbstone from the mould after vibrating, it is necessary, due to the adhereing, to exert some force against it. This could cause certain deformations per se, but also it may result in the removal of the curbstone from the mould being terminated by the curbstone falling a short distance (1 to 2 cm) until the lower surface 2 hits a support surface. Due to the thixotropy of the concrete, such an impact causes the curbstone to be deformed, as the lower portion thereof has a tendency of deliquescing so that, e.g., the side surface 1 no longer is planar but, at least at a lower portion, is curved outwardly. This may result in a lower portion of the curbstone having a width greater than intended. In a corresponding manner the height of the curbstone could be reduced at such widened locations. Finally, the above way of removing the curbstone from the mould results in a risk that the curbstone will be bent, making it necessary to check and adjust the straightness of the curbstone.

After removing the curbstone from the mould and supporting it on the support surface, the support surface is displaced in a horizontal direction towards two straight-edge rules which have surfaces corresponding to the curbstone upper inside surface 3 and lower side surface 4, the support surface being displaced such a distance as to cause sliding between the lower surface 2 of the curbstone and the support surface. In doing so, there is created a proper force between the upper and lower side surfaces of the curbstone and the corresponding surfaces of the rules. When the movement of the support surface has been stopped, the curbstone is contacting the rules, and in this position pressing plates are pressed in the longitudinal direction of the rules against the end surfaces 6 of the curbstone so that the curbstone is compressed in its longitudinal direction until a predetermined length is achieved. When this predetermined length is achieved, the pressing plates are maintained in their pressing positions and shaping members are brought into contact with those portions of the end surfaces 6 extending outside the pressing plates. The shaping members have the purpose of adjusting the shape of the bevels 7 of the end surfaces and of protecting the same during the subsequent process. According to the invention, it is sufficient if the bevels 7 at the side surfaces 1 and the upper surfaces 5 are protected, as only these bevels are visible when the curbstone has been laid. However, it is also possible to protect remaining portions of the bevels 7.

When being pressed between the pressing plates and in contact with the straight-edge rules, there remains only an adjustment of the cross sectional shape of the curbstone, and possibly also an improvement of the surface structure, at least on the visible surfaces, i.e., the side surface 1 and the upper surface 5. According to the invention this is achieved by moving a profiled member in the longitudinal direction of the curbstone and contacting the side surface 1 and the upper surface 5. As the deviation from correct shape normally is greatest at a lower portion of the side surface 1, the concrete in this area would be exposed to a rather high pressure if the profiled member does not have a particularly large contact surface with the curbstone in this area. Such a high pressure can not correct defects as regards the cross sectional shape of the curbstone but will only cause formation of a wave in the concrete in front of and behind the profiled member, i.e., there is only caused a more or less elastic deformation of the material of the curbstone so that the shape defects are transferred to the end portions of the curbstone. According to the invention it is essential that the profiled member exert a uniform pressure (force per unit of area) and further a pressure not so high that there is a risk that the concrete becomes more or less "flowing". To further eliminate the risk that the curbstone will be exposed to a local over pressure, the front and rear edge portions of the profiled member are curved somewhat out from the curbstone, with the result that the force is applied against the material of the curbstone slowly and gradually so that no peak stresses are created and certainly no material is cut away from the curbstone. As the profiled member is brought along the curbstone one or more times, the curbstone is exposed to forces trying to return the intended cross sectional shape. As these forces, which are generated by the profiled member, could be regarded as small at least at some distance inside the curbstone, they do not cause such great and rapid movements in the concrete as could possibly convert it to a more flowable condition. Thus, the adjustment of the cross sectional shape of the curbstone, at least regarding the major part thereof, possibly excluding the surface layer in contact with the profiled member, could be regarded as a more or less static pressing process with a uniform and low pressure.

The thin surface layer in direct contact with the profiled member is exposed to a much more intense agitation. Therefore, this surface layer will be converted to a flowable condition, and a rather fluent, fine suspension of water and concrete is separated. This fluent suspension may enter pores in the treated surfaces of the curbstone so that the curbstone is given a very fine and dense surface structure.

When the adjustment of the cross sectional shape of the curbstone and the improvement of the surface structure, at least on the upper side 5 and the side surface 1, is finished, the profiled member is returned to its rest position. Then the support surface is lowered while keeping the pressing plates in their pressing positions and the shaping members in their positions engaging the bevels 7. In doing so, a pure sliding action occurs in the plane of the end surfaces, between the pressing plates and the end surfaces 6. At the same time also, a pure sliding action occurs between the rules and the two rear side surfaces 3 and 4. This sliding in the plane of the surfaces provides a guarantee that no concrete sticks to the surfaces in question. Further, there is achieved an action rather similar to the smoothing action performed by the profiled member on the side surface 1 and the upper surface 5. As soon as the curbstone is free from engagement with the rules and the pressing plates, the curbstone is removed while supported on the support surface and is transferred to a storage room for hardening of the concrete. In this connection, the pressing plates and the shaping members are returned to their initial positions so that the cycle of operation could be repeated with a new curbstone.

In FIG. 2 there is shown schematically, and for the sake of clarity, only one half of a device for carrying the above method into effect. From the figure it is evident that the device comprises a table 8 movable in the direction of arrow A, straight-edge rules 9 and 10, a device 11 for treating the end portion of the curbstone and a second device 12 for adjusting the cross sectional shape. Apart from the components mentioned above, the inventive device comprises in practice a second table and a second device for treating the opposing end portion of the curbstone. Further, the rules 9 and 10 have a length considerably greater than that shown on the drawing. The second table (not shown on the drawing) is arranged on the same level as the table 8 and is movable together therewith. The second device for treating the opposing end portion of the curbstone is located in the same manner relative to the second table as is the first device 11 relative to the table 8 and the end portions of the rules 9 and 10.

As mentioned above, the table 8 is displaceable in the horizontal direction of arrow A. This could be achieved by supporting the table on rollers or the like on a support surface of any suitable configuration. The movement of the table are controlled by having the table connected to a revolving shaft 13 via a linkage 14. Also the second table is connected to this shaft, whereby the two tables are movable in synchronism in the same horizontal plane. The two tables have the purpose of carrying a support pad or the like, the pad carrying the curbstone when being introduced into the device. In doing so the curbstone is brought to a position where the end surface is substantially aligned with a pressing plate 15 of the device 11 and is movable in the direction of arrow B. Further, the curbstone is located in such a way that the upper side surface 3 and lower side surface 4 respectively are positioned in front of the two straight-edge rules 9 and 10 respectively When displacing the tables in the direction of arrow A, the side surfaces 3 and 4 are pressed against the rules 9 and 10 until a sliding action occurs between the tables and the support pad.

The device 11 for treating the end portion of the curbstone comprises, apart from the pressing plate 15 also an upper shaping member 16 and a side shaping member 17. The end edges of these members, facing the table, are designed in such a way as to correspond to the bevels 7 at the upper surface 5 and the side surface 1 of the curbstone. Therefore, the end surfaces 18 and 19 of the shaping members 16 and 17, respectively are arranged at an angle of 45° both to the longitudinal directions of the shaping members and to the pressing plate 15. The upper shaping member 16 is pivotable about an axis indicated by arrow C, and the side shaping member 17 is pivotable about an axis indicated by arrow D. By pivoting the shaping members in the directions of the arrows, the end surfaces 18 and 19 thereof can be brought to positions (not shown) close to the corresponding edges of the pressing plate 15. Thus, the device 11 will engage both the end surface 6 proper and the bevels 7 of the curbstone. The arrangement of the device 11 (and also the second device for engaging the opposing end portion of the curbstone) is such that the pressing plate 15 is moved towards the end surface 6 of the curbstone and then the shaping members 16 and 17 are pivoted in the directions of arrows C and D, respectively to engage the bevels 7 of the curbstone. In this position the end portions of the shaping members 16 and 17 remote from the curbstone preferably are somewhat displaced towards the center line of the curbstone so that the cross sectional area defined by said end portions is slightly smaller than the cross sectional area of the curbstone. By this arrangement the shaping members 16 and 17 form ramp surfaces preventing an unintended engagement between the shaping members and the profile adjustment device 12 when it is put in motion in the direction of arrow E.

The profile adjustment device 12 comprises at its lower end a rubbing shoe having one side surface 20, for contacting the side surface 1 of the curbstone and one horizontal surface 21, for contacting the upper surface 5 of the curbstone. The junction of the surfaces 20 and 21 is curved in the same way as is the case of the edge portion between the upper surface 5 and the side surface 1 of the curbstone. Further, the rubbing shoe comprises, at its front and rear ends, portions curved out from the curbstone. At an upper portion thereof the rubbing shoe is fastened to a carrier 22, which in turn is displaceably fastened to a guide means indicated in FIG. 2 by the broken line 23. The guide means 23 has such a length that the rubbing shoe is displaceable along the whole length of the curbstone. The details of the guide means 23 and the upper end of the carrier 22 are not of any importance to the invention so long as an adequate guide is provided for the side surface 20 and the upper surface 21 of the rubbing shoe. Finally, the carrier 22 is connected to a drive means (not shown) for displacing the rubbing shoe along the guide means 23.

From FIG. 2 it is clearly seen that the side surface 20 of the rubbing shoe has a much greater length in the direction of movement at its lower end than at it upper end. The reason for this is that the curbstone normally has greater deviations from the correct shape at its lower edge, with the result that too high a pressure is required from the lower portion of the rubbing shoe if the rubbing shoe has a uniform length along the whole height. By the configuration shown, there is instead created a substantially uniform pressure over the whole surface of the rubbing shoe against the curbstone, with the result that there is no risk of wave motions or displacements of the kind mentioned above being created in the material of the curbstone. By this configuration the lower portions of the rubbing shoe will conteract the forces created by the upper portions and thereby downward displacement of shape defects originally present at the upper portions of the curbstone are avoided. Such displacement would have caused or aggravated the formation of waves in front of and behind the lower portion of the rubbing shoe. Thus, the great length of the rubbing shoe prevents the concrete from swelling in front of and behind the rubbing shoe.

The invention can be modified within the scope of the following claims. Thus, it is possible to provide openings in the pressing plates 15 at suitable locations therein. Such openings have the purpose of making it possible to provide the end surfaces 6 of the curbstone with projections and corresponding depressions for locking together adjacent end portions of two curbstones when laid.

I claim:

1. A method of adjusting the shape and dimensions of a substantially straight, elongated concrete article prior to hardening thereof, to bring the shape and dimensions of the article within predetermined tolerances, said method comprising the steps of:

(a) moulding the article in a mould as a substantially straight elongated article, to preliminarily shape the article to substantially conform with the intended final shape, and while the article is still in a plastic condition, (b) removing the article from the mould and placing the article on a support surface with a bottom surface of the article contacting and resting on the support surface, and subsequently (c) urging a first longitudinal side surface of the article against a straight instrument to remove deviations from straightness over the length of the article and to establish that longitudinal side surface as a substantially straight surface, and (d) rubbing the top surface and a second longitudinal side surface of the article, remote from the first longitudinal side surface, in the article longitudinal direction and compressing the article at its longitudinal end surfaces to adjust the shape of the article to a predetermined profile and to fill any voids in and smooth the top surface and the second longitudinal side surface of the article, while urging the second longitudinal side surface toward the straight instrument to maintain contact between the first longitudinal side surface and the instrument to prevent the shape of the article from distorting during the rubbing.

2. The method of claim 1 further comprising removing the article from the straight instrument and the members performing the compressing at the longitudinal end surfaces of the article by movement in a direction causing a pure sliding action between (i) the article and (ii) the straight instrument and the members.

3. the method of claim 1 wherein the concrete article is a curbstone.

4. The method of claim 3 wherein said urging step comprises sliding the bottom surface of the curbstone on the support surface.

5. The method of claim 3 wherein the longitudinal end surfaces are compressed by substantially aligning each of a pair of pressing plates with a respective end surface of said curbstone and moving the pressing plates toward the respective end surfaces in a direction parallel to the length of the curbstone and into contact with the respective end surfaces.

6. The method of claim 5 further comprising pivoting each of a pair of upper shaping members towards upper edge of a corresponding one of the pair of pressing plates to thus dispose a surface of each of the upper shaping members into contact with the corresponding upper edge of the curbstone, and pivoting each of a pair of side shaping members towards a side edge of a corresponding one of the pair of pressing plates to thus dispose a surface of each of the side shaping members into contact with the corresponding side edge of the curbstone.

7. The method of claim 3 further comprising removing the curbstone from the straight instrument and the members performing the compressing at the longitudinal end surfaces of the curbstone by movement in a direction causing a pure sliding action between (i) the curbstone and (ii) the straight instrument and the members.

8. The method of claim 7 further comprising transferring the curbstone to a storage area for hardening.

9. The method of claim 7 further comprising returning the pressing plates and the shaping members to their initial positions and repeating the method with a new curbstone.

10. The method of claim 1, in which the urging of the second longitudinal side surface of the article towards the straight instrument comprises subjecting the second longitudinal side surface to a pressure substantially uniform over the height of the second longitudinal side surface while rubbing the top surface and the second longitudinal side surface of the article.

11. The method of claim 1, wherein the step of urging the first longitudinal side surface against the straight instrument comprises displacing the support surface towards the straight instrument to cause a sliding action between the article bottom surface and the support surface.

12. The method of claim 11, wherein the step of rubbing the top surface and the second longitudinal side surface of the article includes applying to the second longitudinal side surface a pressure generally uniform over the entire height of the second longitudinal side surface and directed toward the straight instrument.

13. The method of claim 12, further comprising the step of effecting relative movement between (a) the article and the straight instrument and (b) the article and the members performing the compressing at the longitudinal end surfaces of the article; said relative movement being so directed as to cause sliding action between the article and the instrument and the members at the respective contact surfaces therebetween.

* * * * *